United States Patent
Karl

(10) Patent No.: US 6,471,763 B1
(45) Date of Patent: Oct. 29, 2002

(54) OXIDATIVELY AFTERTREATED CARBON BLACK

(75) Inventor: Alfons Karl, Gründau (DE)

(73) Assignee: Degussa-Huls AG, Hanau (DE)

( * ) Notice: Subject to any disclaimer, the term of this patent is extended or adjusted under 35 U.S.C. 154(b) by 0 days.

(21) Appl. No.: 09/321,874

(22) Filed: May 28, 1999

(30) Foreign Application Priority Data

May 29, 1998 (DE) ......................... 198 24 047

(51) Int. Cl.$^7$ .......................... C09D 1/44; C09D 3/00; C01D 3/00
(52) U.S. Cl. ..................... 106/478; 423/449.5
(58) Field of Search ................... 106/478; 423/449.5

(56) References Cited

U.S. PATENT DOCUMENTS

| | | | |
|---|---|---|---|
| 3,245,820 A | 4/1966 | Melore | 106/478 |
| 3,436,240 A | * 4/1969 | Rogers et al. | 106/478 |
| 3,536,512 A | * 10/1970 | Deery | 106/478 |
| 3,620,792 A | * 11/1971 | Hagopian | 106/478 |
| 6,099,632 A | * 8/2000 | Nagasawa et al. | 106/31.9 |
| 6,136,286 A | * 10/2000 | Okuyama et al. | 423/499.1 |

FOREIGN PATENT DOCUMENTS

| | | |
|---|---|---|
| DE | 195 11 240 A1 | 10/1995 |
| WO | WO 93/18094 | 9/1993 |

* cited by examiner

Primary Examiner—Helene Klemanski
Assistant Examiner—Veronica F. Faison
(74) Attorney, Agent, or Firm—Pillsbury Winthrop LLP

(57) ABSTRACT

An oxidatively aftertreated carbon black has a content of volatile constituents of more than 10 wt. %, based on its total weight, and the ratio of its CTAB surface area to the iodine adsorption number is greater than 2 m$^2$/mg. The carbon black may be a channel black oxidatively aftertreated with ozone. The carbon black according to the invention is used preferably as pigment carbon black for the production of water-based paints, printing inks and as inks for mechanical and manual recording and drawing instruments. The combination of properties imparts to the carbon black an excellent dispersibility in water-based binder systems. The paints, printing inks and printer inks produced from this carbon black have an outstanding stability in storage.

4 Claims, 1 Drawing Sheet

OXIDATIVELY AFTERTREATED CARBON BLACK

CROSS-REFERENCE TO RELATED APPLICATION

This application is based on German Application DE 1982404.3, filed May 29, 1998, which disclosure is incorporated herein by reference.

FIELD OF THE INVENTION

This invention relates to an oxidatively aftertreated carbon black for use as pigment in paints, printing inks and inks, for example, for use in ink-jet printers.

BACKGROUND OF THE INVENTION

Owing to its outstanding properties, carbon black is the main black pigment used in paints and in printing inks. A large selection of pigment carbon blacks having different properties is available. Various processes are used for the production of pigment carbon black. Production is most frequently by oxidative pyrolysis of the carbon-containing raw materials of carbon black. In such a process, the raw materials of carbon black undergo incomplete combustion at elevated temperatures in the presence of oxygen. Examples of this type of process for producing carbon black include the furnace black process, the channel black process and the lampblack process. The carbon-containing raw materials of carbon black used are mainly polynuclear aromatic carbon black oils.

In the furnace black process, the incomplete combustion takes place in a reactor lined with highly refractory material. To this end, a stream of hot waste gas is produced in a preliminary combustion chamber by combustion of a fuel/air mixture and the carbon black raw material is sprayed or injected into this stream of hot waste gas. The carbon black which forms is quenched by water sprayed into the reactor and separated from the stream of gas. The furnace black process permits the production of carbon blacks possessing a very wide range of properties which are useful in practice.

The lampblack and channel black processes are important alternatives to the furnace black process. They yield carbon blacks having properties that overlap to some extent with the useful properties of carbon black which are obtainable by the furnace black process, but they also render possible the production of carbon blacks which cannot be produced through the furnace black process.

The lampblack apparatus consists of a cast-iron shell, which accommodates the liquid or optionally molten raw material, and a fume hood with a refractory lining. The air gap between the shell and fume hood and the partial vacuum in the system serve to regulate the air supply and consequently to influence the properties of the carbon black. The raw material vaporizes as a result of the heat radiation from the fume hood and undergoes partial combustion, but is mainly converted into carbon black. After having been cooled, the process gases containing the carbon black are passed to a filter to separate off the carbon black.

In the channel black process, the carbon black raw material is first of all vaporized into a stream of carrier gas containing steam and then undergoes combustion in a multiplicity of small flames under a cooled cylinder. A portion of the carbon black formed is deposited on the cylinder and another portion is discharged together with the process gases and deposited in a filter.

The important properties for assessing pigment carbon blacks are the blackness value $M_Y$ (in accordance with DIN 55979), relative tinting strength (preparation of a carbon black paste in accordance with DIN EN ISO 787/16 and evaluation in accordance with DIN EN ISO 787/24), the oil absorption (in accordance with DIN EN ISO 787/5), the volatile constituents (in accordance with DIN 53552), the structure, measured as DBP adsorption (in accordance with DIN 53601 or ASTM D2414), the average primary particle size (by assessment of electron micrographs) and the pH value (in accordance with DIN EN ISO 787/9 or ASTM D1512).

Table 1 shows the ranges of properties of pigment carbon blacks obtainable by the above-mentioned production processes. The data in Table 1 were gathered from technical publications by various manufacturers of carbon black regarding the characteristic carbon black values found for carbon blacks which had not been oxidatively aftertreated.

TABLE 1

| Property | Furnace black | Channel black | Lamp-black |
|---|---|---|---|
| Blackness value $M_Y$ | 210–270 | 230–300 | 200–220 |
| Relative tinting strength IRB3 = 100 | 60–130 | 90–130 | 25–35 |
| Oil absorption [g/100 g] | 200–500 | 400–1100 | 250–400 |
| DBP adsorption [ml/100 g] | 40–200 | | 100–120 |
| Particle size [nm] | 10–80 | 10–30 | 110–120 |
| volatile constituents[wt. %] | 0.5–1.5 | 4–6 | 1–2.5 |
| pH value | 8–10 | 4–6 | 6–9 |

For a paint or a printing ink, important properties in use are the stability of the carbon black dispersion in the binder system (stability in storage) and the rheological behavior of the paint or the printing ink (viscosity and thixotropy). They are influenced crucially by the chemical structure of the surface of the carbon blacks.

The surface chemistry of the carbon blacks depends greatly on the chosen production process. In the furnace black process, the formation of the carbon black takes place in a highly reducing atmosphere, whereas in the channel black process, the atmospheric oxygen has free access to the zone where carbon black formation occurs. Accordingly, even directly after the production, the content of surface oxides in the channel blacks is considerably greater than in the case of the furnace blacks.

The surface oxides are in the main carboxyl groups, lactols, phenols and quinones, which give rise to an acidic reaction in aqueous dispersions of carbon black. To a lesser extent, the carbon blacks also have basic oxides at the surface. The surface oxides form the so-called volatile constituents of the carbon black, as they can be desorbed from the carbon black surface by calcining the carbon blacks at 950° C. (DIN 53552).

The content of volatile constituents has a crucial influence on the dispersibility of the carbon blacks, particularly in aqueous systems. The greater the content of volatile constituents in the carbon blacks, the lesser is the hydro-phobic character of the carbon blacks and the more readily are they dispersed in water-based binder systems.

For the reasons given above, pigment carbon blacks are generally aftertreated oxidatively in order to increase their content of volatile constituents. Nitric acid, nitrogen dioxide and, to a lesser extent, ozone as well, are used as oxidizing agents. The contents of volatile constituents and the pH values given in Table 1 can be increased by oxidative aftertreatment. In this connection, the oxidation behavior depends crucially on the carbon black production process. In the case of furnace blacks, the content of volatile constituents can be increased to only about 6 wt. %. This is as reported in U.S. Pat. No. 3,565,657 regarding the oxidation of furnace blacks by nitric acid. The highest content of volatile constituents given in the said patent is 7.6 wt. %.

In several patents it has been attempted, by ozone treatment of furnace blacks, to reproduce the advantageous properties possessed by channel blacks due to the high content of volatiles in the latter. Among these are the U.S. Pat. Nos. 3,245,820, 3,364,048 and 3,495,999. According to U.S. Pat. No. 3,245,820, the content of volatiles in furnace blacks could be increased to 4.5 wt. % by the ozone treatment.

Another important property of the carbon blacks is their specific surface, which is determined by various adsorption methods. In the determination of the nitrogen surface area (BET surface area in accordance with DIN 66132), one assumes that the surface of the carbon black is covered with nitrogen molecules, the known spatial requirement of the nitrogen molecule rendering possible a conversion into $m^2/g$. As the small nitrogen molecule can also penetrate into pores and crevices in the carbon black, this method also includes the internal surface area of the carbon black. Cetyltrimethyl-ammonium bromide (CTAB) has a spatial requirement larger than that of nitrogen. The CTAB surface area (measured in accordance with ASTM D-3765) therefore comes closest to the determination of the geometrical surface without pores. Hence the CTAB surface area correlates very well with the particle size and thus allows conclusions as to the behavior of the carbon blacks in use.

The iodine adsorption number is a third method of characterizing the surface area of carbon blacks. The iodine adsorption number is measured in accordance with ASTM D-1510. It is greatly influenced by surface groups and by adsorbed PAH's (=polyaromatic heterocyclic compounds). The adsorption measured in mg/g is not therefore converted into $m^2/g$. Generally the iodine adsorption is only given in the case of carbon blacks containing less than 1.5 wt. % of volatile constituents and less than 0.25 wt. % of a toluene extract. Owing to its sensitivity to the surface surface groups, however, the iodine adsorption can be used especially as a further possible method of characterizing oxidized carbon blacks having a high content of volatile constituents.

SUMMARY OF THE INVENTION

The object of the present invention is to specify carbon blacks for paints and printing inks, which carbon blacks are distinguished by having an improved dispersing behavior in water-based binder systems and by the improved stability in long-term storage of the paints and printing inks produced from them.

This object is achieved by an oxidatively aftertreated carbon black, which is characterized in that its content of volatile constituents is more than 10 wt. %, preferably more than 15 wt. %, based on its total weight, and the ratio of its CTAB surface area to the iodine adsorption number is greater than 2 $m^2/mg$. The ratio of the CTAB surface area to the iodine adsorption number is preferably greater than 4 $m^2/mg$. In addition, these carbon blacks have no measurable concentration of basic surface oxides.

In this connection, the CTAB surface area and iodine adsorption number are measured in accordance with the ASTM standards cited above. It is important here that, prior to the measurement, the carbon blacks are not subjected to a heat treatment for the desorption of the volatile constituents.

It has been found that the consequence of the required combination of properties relating to volatile constituents and to a certain minimum ratio of the CTAB surface area to the iodine value in carbon blacks is that the latter can be very easily dispersed in water and that this dispersion remains stable for days, without the necessity of adding a wetting agent or dispersing additive. This high stability in storage of the aqueous dispersion of carbon blacks renders the carbon blacks according to the invention particularly suitable for use in paints, in printing inks and as inks for mechanical and manual recording and drawing instruments, hence, for example, as inks for ink-jet printers, felt-tip pens and ballpoint pens.

The carbon blacks according to the invention can be obtained by ozone oxidation of channel blacks. Furnace blacks are unsuitable as carbon black starting materials, because their content of volatile constituents cannot be increased to more than about 7 to 8 wt. %, even by ozone oxidation. From appropriate measurements of commercial pigment carbon blacks carried out by various manufacturers, it can be easily shown that the combination of properties of the inventive oxidatively aftertreated carbon blacks was hitherto unknown. Such measurements are reproduced in Table 2.

TABLE 2

Properties of commercial pigment carbon blacks

| Carbon black | Volatile constituents [wt. %] | CTAB surface area [$m^2/g$] | Iodine adsorption numbers [mg/g] | CTAB/Iodine [$m^2/mg$] |
|---|---|---|---|---|
| CABOT | | | | |
| Monarch 1300 | 11.7 | 363 | 479 | 0.76 |
| Monarch 1000 | 12.4 | 255 | 314 | 0.81 |
| Mogul L | 4.8 | 132 | 110 | 1.20 |
| COLUMBIAN | | | | |
| Raven 5000 UII | 15.2 | 346 | 302 | 1.15 |
| Raven 1255 | 6.2 | 119 | 73 | 1.63 |
| DEGUSSA | | | | |
| FW 200 | 24.0 | 485 | 255 | 1.90 |
| FW 1 | 4.3 | 236 | 239 | 0.99 |
| Printex U | 5 | 99 | 63 | 1.57 |
| Printex 90 | 1 | 250 | 350 | 0.71 |
| SS 550 | 2.5 | 120 | 101 | 1.19 |

In this table, the commercial channel black FW 200 is noteworthy. This is a channel black which is not oxidized by ozone. Despite its high content of volatile constituents, it does not exhibit the required ratio of CTAB/iodine.

DETAILED DESCRIPTION OF THE PREFERRED EMBODIMENTS

Figure 1:
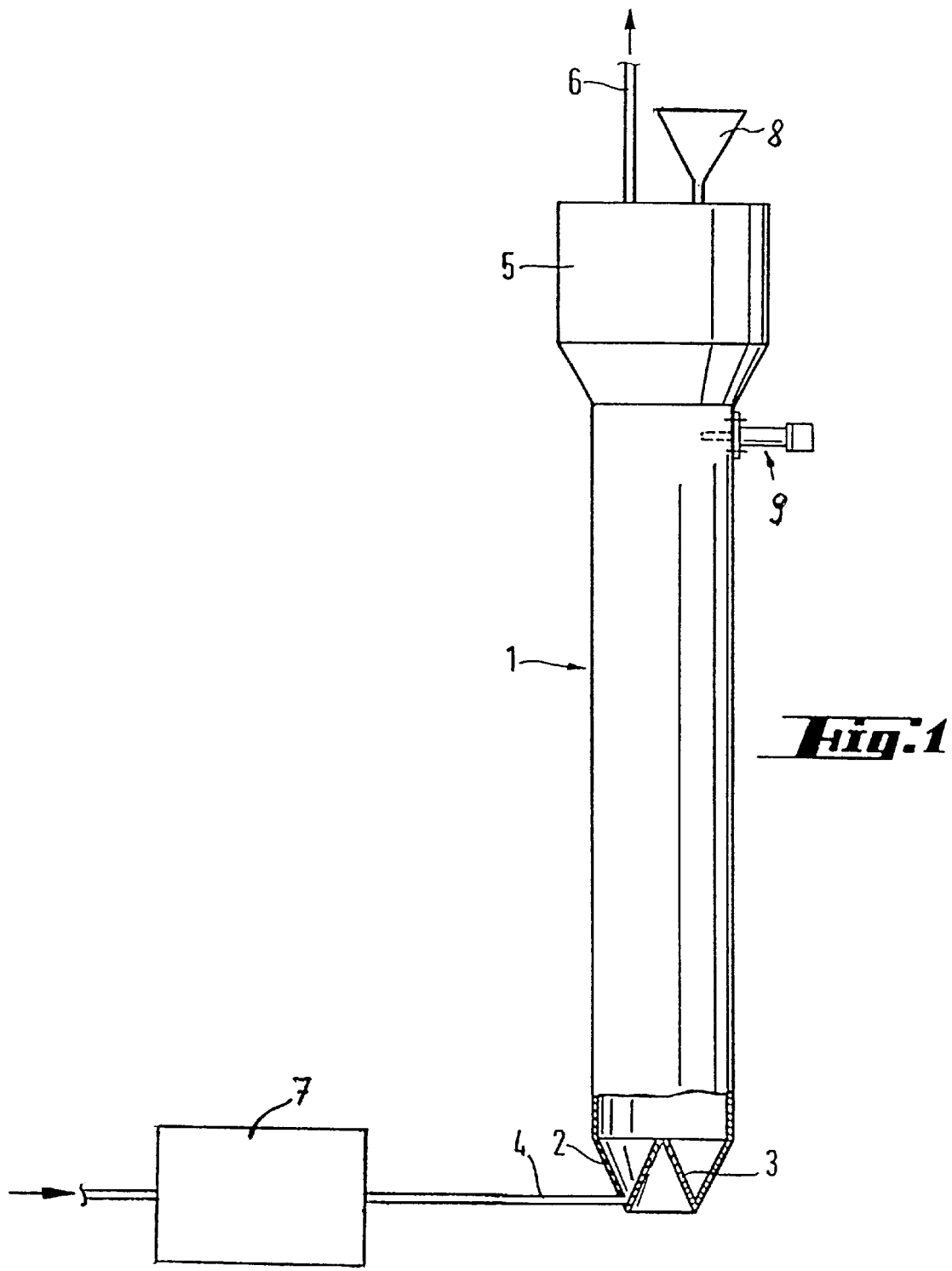
FIG. 1: Apparatus for the oxidation of carbon blacks by ozone.

FIG. 1 shows a suitable fluid-bed apparatus for the batchwise oxidation of carbon black by ozone. The apparatus consists of a vertically arranged cylindrical treatment vessel (1). This has at its lower end a fluidizing section comprising a jacket (2) in the form of a truncated cone passing downwards from the cross-section of the cylinder, a conical upwardly-pointing displacing unit (3) inserted into the truncated cone and, at the lowest point of the fluidizing section, at least one substantially tangentially running inlet pipe (4) for the treatment gas. A relieving section (5) with an outlet pipe (6) for the waste gas is mounted above the treatment vessel (1). Carbon black can be introduced into the treatment vessel via the filler necks (8) for the carbon black. A sensor (9) Ts an indicator for controlling the height of the fluid bed. To produce the ozone, the treatment gas (air or oxygen) is passed through the ozone generator (7) prior to entry into the treatment vessel. The treatment vessel (1) has an internal diameter of 8 cm and a height of 1.5 m.

The carbon black is oxidized batchwise by means of the apparatus illustrated in FIG. 1. However, a continuous mode of operation can also be put into effect by an appropriate arrangement of the fluid bed.

An ozonizer having the following performance data was used for the oxidation tests:

Operating pressure: max. 0.6 bar

Carrier gas flow: max. 600 l/h

Cooling water: 40 l/h (15° C.)

Operating temperature: max. 35° C.

Generator voltage: 16 kV

The ozone concentration attainable is dependent on the generator voltage, on the flow of carrier gas and on its oxygen content. At a generator voltage of 16 kV, by using air a maximum of 12 g ozone/h is attained and by using oxygen a maximum of 25 g ozone/h is attained.

Increase in the volatile content

Decrease in the pH value

Increase in the CTAB surface area

Decrease in the iodine adsorption number

Decrease in the DIN relative tinting strength

Decrease in the oil adsorption

Significant change in the composition of the surface oxides

The changes in the CTAB surface area and iodine adsorption number do not mean that the particle size and therefore the surface are altered by the ozone oxidation, especially as the effects are opposite. Rather, the adsorption of iodine and of CTAB is influenced to such an extent by the modification of the surface of the carbon black, that the values obtained are no longer a measure of the surface. But they are suitable, along with the content of volatile constituents, for obtaining additional evidence regarding the nature of the modification of the surface as a result of the oxidation treatment.

In the highly oxidized carbon blacks, the $M_Y$ value increases to 328. The composition of the surface oxides also changes as the degree of oxidation increases. The carboxyl groups and quinones increase sharply, whereas the phenolic groups and the basic oxides decrease. The lactol content remains virtually unchanged.

TABLE 3

Analytical data for carbon blacks oxidized by ozone

| | | Duration of treatment of FW1 with ozone [h] | | | | | | |
|---|---|---|---|---|---|---|---|---|
| Property | Unit | 0 | 1 | 2 | 4 | 8 | 16 | FW 200 |
| Characteristic data for carbon black | | | | | | | | |
| CTAB surface area | m²/g | 236 | 246 | 269 | 311 | 306 | 361 | 485 |
| Iodine adsorption number | mg/g | 239 | 198 | 126 | 66 | 67 | 30 | 255 |
| CTAB/Iodine | m²/mg | 0.99 | 1.24 | 2.14 | 4.71 | 4.7 | 12.03 | 1.90 |
| BET surface area | m²/g | 264 | | | | | | |
| $M_Y$ value | | | 279 | 281 | 292 | 295 | 328 | |
| DIN relative tinting strength | | 104 | 106 | 102 | 92 | 92 | 82 | 91 |
| Oil adsorption | g/100 g | 995 | 855 | 560 | 390 | 540 | 295 | 620 |
| Volatile content | wt. % | 4.3 | 7.2 | 10.6 | 16.0 | 16.4 | 22.7 | 24.0 |
| pH value | | 4.4 | 3.8 | 3.3 | 3.1 | 3.0 | 2.9 | 2.8 |
| Surface oxides | | | | | | | | |
| Carboxyl groups | mmol/kg | 59 | 97 | 228 | 525 | 550 | 922 | 981 |
| Lactols | mmol/kg | 50 | 78 | 50 | 50 | 38 | 55 | 78 |
| Phenols | mmol/kg | 94 | 94 | 60 | 63 | 68 | 23 | 261 |
| Quinones | mmol/kg | 100 | 175 | 506 | 1012 | 1132 | 1445 | 1208 |
| Basic oxides | mmol/kg | 59 | 38 | 0 | 0 | 0 | 0 | 0 |

EXAMPLE 1

The channel black FW 1 was oxidised with ozone for different periods of time in the apparatus shown in FIG. 1 and then analyzed with-regard to those properties which are useful in a carbon black.

In all oxidation tests, the ozonizer was operated with a constant flow of air of 310 Nl/h. The fluid bed was loaded each time with 200 g of carbon black. For all tests, the reaction temperature was in the range between 20° and 30° C. Table 3 shows the results obtained after treating FW 1 for different lengths of time, compared with untreated FW 1 and with the commercially oxidized channel black FW 200.

From Table 3, the following are observed to depend on the duration of the ozone oxidation:

The channel black FW 200 not oxidized by ozone exhibits a quite different ratio of CTAB surface area to iodine adsorption number, a fact which can be attributed to the different composition of the surface oxides.

Example of Use

A particular advantage of the carbon blacks according to the invention is their ready dispersibility in water and the high stability of this dispersion. To investigate this behavior, so-called settling tests were carried out on the carbon black according to the invention and standard commercial carbon blacks. To this end, in each case 1 gram of carbon black was dispersed ultrasonically in 99 ml water, without a wetting agent, for a period of 5 minutes and the settling of the dispersed carbon black was then observed. The beakers used for these investigations had a volume of 150 ml and a diameter of 5 cm. In the case of the carbon blacks not oxidized by ozone, a settling of the carbon black was already occurring after 15 minutes. A clear layer, free from carbon black, formed at the upper edge of the liquid surface. The settling behavior found is shown in detail in Table 4.

TABLE 4

Settling behavior of various carbon blacks

| Carbon black | Oxidation by | | Volatile content [wt. %] | Settling after 15 minutes [cm] |
|---|---|---|---|---|
| SS 550 | F[1)] | NO$_2$ | 2.5 | 1 |
| FW 200 | G[2)] | NO$_2$ | 24.0 | 0.5 |
| Printex 90 | F | — | 1 | 1 |
| Printex U | G | — | 5 | 0.25 |
| FW1 | G | — | 4.3 | 0.5 |
| FW1 | G | Ozone | 15 | 0 |

[1)]F: Furnace black;
[2)]G: Channel black

In the case of the channel black FW1 oxidized by ozone according to the invention, no settling of the carbon black was to be detected even after a week.

What is claimed is:

1. Ozone oxidized aftertreated channel black, having a content of volatile constituents of more than 10 wt. %, based on its total weight, and the ratio of CTAB surface area to iodine adsorption number is greater than 2 m$^2$/mg, wherein ozone oxidation occurs at a temperature ranging between 20° C. and 30° C. in a fluid bed such that surface oxide composition of the channel black is altered to enable the channel black to exhibit said ratio of CTAB surface area to iodine adsorption number.

2. Ozone oxidized aftertreated channel black having a content of volatile constituent of more than 15 wt. %, based on total aftertreated channel black weight, an ozone content of 0.12 to 0.96 g ozone/g carbon black, and a ratio of CTAB surface area to iodine adsorption number greater than 2 m$^2$/mg, wherein said ratio is measured after ozone oxidation occurs at a temperature ranging between 20° C. and 30° C. in a fluid bed such that surface oxide composition of the channel black is altered to enable the channel black to exhibit said ratio of CTAB surface area to iodine adsorption number.

3. Ozone oxidized treated channel black according to claim 1, wherein the ratio of the CTAB surface area to the iodine adsorption number is greater than 4 m$^2$/mg.

4. A method for using channel black in paints, printing inks or in inks for mechanical and manual recording and drawing instruments, comprising:

adding channel black according to claim 1 to a process mixture for making the paints, printing inks or inks for mechanical and manual recording and drawing instruments.

* * * * *